US012786661B2

(12) United States Patent
Abe

(10) Patent No.: US 12,786,661 B2
(45) Date of Patent: Nov. 3, 2026

(54) COMMUNICATION CONTROL SYSTEM, COMMUNICATION CONTROL DEVICE, AND COMMUNICATION CONTROL METHOD

(71) Applicant: NEC Corporation, Tokyo (JP)

(72) Inventor: Satoki Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 286 days.

(21) Appl. No.: 18/689,931

(22) PCT Filed: Sep. 14, 2021

(86) PCT No.: PCT/JP2021/033656
§ 371 (c)(1),
(2) Date: Mar. 7, 2024

(87) PCT Pub. No.: WO2023/042243
PCT Pub. Date: Mar. 23, 2023

(65) Prior Publication Data
US 2024/0388870 A1 Nov. 21, 2024

(51) Int. Cl.
*H04W 4/021* (2018.01)

(52) U.S. Cl.
CPC .................................. *H04W 4/021* (2013.01)

(58) Field of Classification Search
CPC ......... H04W 4/00; H04W 4/02; H04W 4/021; H04W 4/023; H04W 4/024; H04W 4/029; H04W 4/20; H04W 4/80; H04W 68/00; H04W 68/10
USPC ..... 455/432.3, 438, 456.3, 456.5, 456.6, 68, 455/69, 70
See application file for complete search history.

(56) References Cited

U.S. PATENT DOCUMENTS

2006/0111109 A1* 5/2006 Kim ....................... H04H 20/74 455/412.2
2006/0121914 A1* 6/2006 Kim ...................... H04W 36/14 455/456.1

(Continued)

FOREIGN PATENT DOCUMENTS

JP 2002-351905 A 12/2002
JP 2009-094559 A 4/2009

(Continued)

OTHER PUBLICATIONS

JP Office Action for JP Application No. 2023-547950, mailed on Feb. 4, 2025 with English Translation.

(Continued)

*Primary Examiner* — Young T. Tse
(74) *Attorney, Agent, or Firm* — Sughrue Mion, PLLC

(57) ABSTRACT

In order to make it possible to suitably change a service area even in a case where an area in which a first terminal apparatus is present has changed, a communication control system includes: a terminal location area determination section (11) that determines a first presence area in which the first terminal apparatus is located; a service area determination section (12) that determines, in accordance with the determined first presence area, a service area which provides a network service; and a control section (13) that controls connection between the network service and a second terminal apparatus in accordance with the determined service area.

18 Claims, 8 Drawing Sheets

(56) References Cited

U.S. PATENT DOCUMENTS

| | | | | |
|---|---|---|---|---|
| 2007/0287474 | A1* | 12/2007 | Jenkins | H04W 4/02 455/456.2 |
| 2015/0350926 | A1* | 12/2015 | Uchiyama | H04M 11/08 455/418 |
| 2020/0187154 | A1* | 6/2020 | Li | H04W 76/27 |
| 2022/0095348 | A1* | 3/2022 | Zhao | H04W 4/023 |

FOREIGN PATENT DOCUMENTS

| | | | |
|---|---|---|---|
| JP | 2013-529409 | A | 7/2013 |
| JP | WO2017/094246 | A1 | 9/2018 |
| JP | 2018-205848 | A | 12/2018 |
| JP | WO2018/174225 | A1 | 1/2020 |
| JP | 2020-530244 | A | 10/2020 |
| WO | 2020/031326 | A1 | 2/2020 |

OTHER PUBLICATIONS

International Search Report for PCT Application No. PCT/JP2021/033656, mailed on Nov. 30, 2021.

* cited by examiner

| LADN INFORMATION | PRESENCE INFORMATION | UE IDENTIFIER | REPRESENTATIVE INFORMATION |
|---|---|---|---|
| LADN60 | TA21 | UE11 | TRUE |
| LADN60 | TA21 | UE12 | FALSE |
| LADN60 | TA24 | UE13 | FALSE |
| ⋮ | ⋮ | ⋮ | ⋮ |

COMMUNICATION CONTROL SYSTEM, COMMUNICATION CONTROL DEVICE, AND COMMUNICATION CONTROL METHOD

This application is a National Stage Entry of PCT/JP2021/033656 filed on Sep. 14, 2021, the contents of all of which are incorporated herein by reference, in their entirety.

TECHNICAL FIELD

The present invention relates to a communication control system, a communication control apparatus, and a communication control method.

BACKGROUND ART

Conventionally, there has been developed a technique for providing, in a wireless communication system, a network service with a limited service provision range to a terminal. Examples of a technique for establishing a protocol data unit (PDU) session for local area data network (LADN) service include the invention disclosed in Patent Literature 1 below. Furthermore, examples of a technique in which a terminal serving as a master controls establishment of connection of other terminals include the invention disclosed in Patent Literature 2 below.

Patent Literature 1 relates to a method for user equipment (UE) to use an LADN. For each LADN data network name (DNN) configured in an access and mobility function (AMF), corresponding LADN service area information includes a set of tracking areas (TAs) that belong to a registration area which is assigned to UE by the AMF. The AMF can provide, to the UE, an intersection area of an LADN service area and a current registration area as LADN information relating to the LADN that can be used by the UE.

Patent Literature 2 relates to a group procedure for a machine type communication device. Special UE or master UE can carry out an action on behalf of one or more members of a group. A group mobility procedure can be optimized by being controlled by the special UE or master UE. Patent Literature 2 indicates that the group mobility procedure can be controlled by the master UE and establishment of connection of other one or more pieces of UE can be controlled.

CITATION LIST

Patent Literature

[Patent Literature 1]
Published Japanese Translation of PCT International Application Tokuhyo No. 2020-530244
[Patent Literature 2]
Published Japanese Translation of PCT International Application Tokuhyo No. 2013-529409

SUMMARY OF INVENTION

Technical Problem

In Patent Literature 1 described earlier, the AMF can provide, to the UE, an intersection area of an LADN service area and a current registration area as LADN information relating to the LADN that can be used by the UE. However, in the technique disclosed in Patent Literature 1, in a case where an area in which the UE is present has changed due to movement of the UE, it may be impossible to receive an LADN service that has been used.

In Patent Literature 2 described earlier, it is possible for special UE or master UE to control establishment of connection of other one or more pieces of UE. Patent Literature 2 is a technique in which master UE acts on behalf of other pieces of UE only in terms of cell reselection and/or a handover. Thus, in a network service with a limited service provision range, in a case where an area in which master UE is present has changed due to movement of the master UE, it may be impossible to receive the network service used by other one or more pieces of UE.

An example aspect of the present invention has been made in view of the above problems, and an example object thereof is to provide a technique that makes it possible to suitably change a service area even in a case where an area in which a terminal apparatus is present has changed.

Solution to Problem

A communication control system according to an example aspect of the present invention includes at least one processor, the at least one processor carrying out: determining a first presence area in which a first terminal apparatus is located; determining, in accordance with the determined first presence area, a service area which provides a network service; and controlling, in accordance with the determined service area, connection between the network service and a second terminal apparatus which uses the network service.

A communication control apparatus according to an example aspect of the present invention includes at least one processor, the at least one processor carrying out: determining a first presence area in which a first terminal apparatus is located; determining, in accordance with the determined first presence area, a service area which provides a network service; and controlling, in accordance with the determined service area, connection between the network service and a second terminal apparatus which uses the network service.

A communication control method according to an example aspect of the present invention includes: determining a first presence area in which a first terminal apparatus is located; determining, in accordance with the determined first presence area, a service area which provides a network service; and controlling, in accordance with the determined service area, connection between the network service and a second terminal apparatus which uses the network service.

Advantageous Effects of Invention

An example aspect of the present invention makes it possible to suitably change a service area even in a case where an area in which the first terminal apparatus is present has changed.

EXAMPLE EMBODIMENTS

First Example Embodiment

The following description will discuss a first example embodiment of the present invention in detail with reference to the drawings. The present example embodiment is an embodiment serving as a basis for an example embodiment described later.

<Overview of Communication Control System 100>

Schematically speaking, a communication control system 100 according to the present example embodiment determines a service area of a network service in accordance with a first presence area in which a first terminal apparatus is present. Then, the communication control system 100 controls connection between the network service and a second terminal apparatus in accordance with the determined service area. This enables the service area to be suitably changed even in a case where the first presence area in which the first terminal apparatus is present has changed.

<Configuration of Communication Control System 100>

Figure 1:
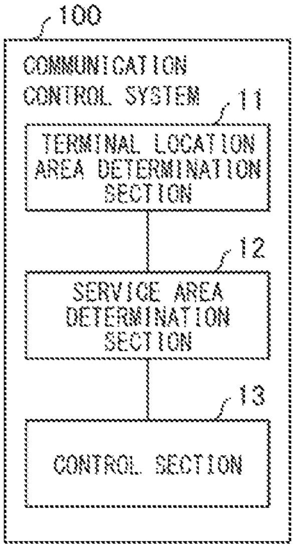
FIG. 1 is a block diagram illustrating a functional configuration of a communication control system according to a first example embodiment of the present invention.

The following description will discuss, with reference to FIG. 1, a configuration of the communication control system 100 according to the present example embodiment. FIG. 1 is a block diagram illustrating the configuration of the communication control system 100.

As illustrated in FIG. 1, the communication control system 100 includes a terminal location area determination section 11, a service area determination section 12, and a control section 13. The terminal location area determination section 11 is configured to achieve a terminal location area determination means in the present example embodiment. The service area determination section 12 is configured to achieve a service area determination means in the present example embodiment. The control section 13 is configured to achieve a control means in the present example embodiment.

The terminal location area determination section 11 determines the first presence area in which the first terminal apparatus is located. The first terminal apparatus is a representative terminal apparatus that plays a special role of managing a service area which can be connected to a network service. The first presence area is an area in which the first terminal apparatus is present, and may be expressed as an area indicated by TA information in a 5th generation mobile communication system (5G) core network (hereinafter, referred to as "5GC") or a 4th generation mobile communication system (4G) core network (hereinafter, referred to as "4GC") defined by 3rd generation mobile communication system partnership project (3GPP). In the above description, the first presence area is the area indicated by the TA information in the 5GC or 4GC. Note, however, that the network is not limited to these 5GC and 4GC. Note also that information for determining the first presence area is not limited to the TA information, but may be, for example, location information which indicates a current location of the first terminal apparatus.

The second terminal apparatus may be a terminal apparatus that is registered, in the control section 13, as a group identical to the group to which the first terminal apparatus belongs, or may be any terminal apparatus. For example, the second terminal apparatus may be a terminal apparatus that uses a network service identical to the network service which is used by the first terminal apparatus, or may be a terminal apparatus that is registered as participating in an event identical to the event in which the first terminal apparatus participates.

The service area determination section 12 determines, in accordance with the determined first presence area, a service area which provides a network service. The network service is, for example, a network service such as an LADN.

The LADN is a data network to which only a terminal apparatus that is present in a specific service area can be connected. The service area determination section 12 determines, as a service area of the LADN, the first presence area in which the first terminal apparatus is present. Thus, in a case where the second terminal apparatus is located in the first presence area, the second terminal apparatus can also enjoy a service of the LADN.

The control section 13 controls connection between the second terminal apparatus and the network service in accordance with the determined service area. For example, in a case where the second terminal apparatus is located in the first presence area, the control section 13 connects the second terminal apparatus and the LADN. In a case where the second terminal apparatus is not located in the first presence area, the control section 13 disconnects communication between the second terminal apparatus and the LADN.

Assume, for example, a case where a terminal apparatus of a customer is connected to a network service in an event of a customer participation type (a puzzle-solving game, a bus tour, or the like) that is held at a specific place, and the customer participates in a game while uploading and/or downloading information pertaining to the event to/from the network service. In this case, assuming that the first presence area in which the first terminal apparatus is located is changed in accordance with a change in place at which the event is held, the control section 13 determines, as the service area of the network service, the first presence area which has been changed. Thus, the second terminal apparatus that is moved, in accordance with movement of the first terminal apparatus, to an area identical to the area to which the first terminal apparatus has been moved can continue to be connected to the network service.

Note here that the first terminal apparatus is a representative terminal apparatus and may be possessed by an organizer of the event. The second terminal apparatus is a terminal apparatus that is registered, in the control section 13, as a group that uses a network service identical to the network service used by the first terminal apparatus.

Note that functions of sections of the communication control system 100 may be implemented in a cloud. Furthermore, for example, the terminal location area determination section 11 and the service area determination section 12 may constitute a single apparatus, and the control section 13 may constitute a single apparatus. These sections may be mounted on a single apparatus, or may be mounted on separate apparatuses. For example, in a case where the sections are mounted on separate apparatuses, pieces of information pertaining to the respective sections are transmitted and received via a communication network to proceed with a process.

<Effect of Communication Control System 100>

As described above, according to the communication control system 100 according to the present example embodiment, the service area determination section 12 determines, in accordance with the determined first presence area, a service area which provides a network service. Thus, the service area can be suitably changed even in a case where an area in which the first terminal apparatus is present has changed.

The control section 13 controls connection between the second terminal apparatus and the network service in accordance with the determined service area. Thus, the connection between the second terminal apparatus and the network service is suitably controlled in accordance with the changed service area.

<Flow of Communication Control Method Carried Out by Communication Control System 100>

Figure 2:
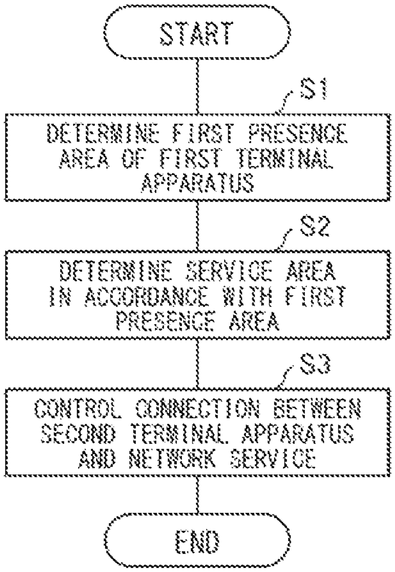
FIG. 2 is a flowchart showing a flow of a communication control method in the communication control system according to the first example embodiment of the present invention.

The following description will discuss, with reference to FIG. 2, a flow of a communication control method carried out by the communication control system 100 configured as described above. FIG. 2 is a flowchart showing the flow of the communication control method in the communication control system 100 according to the first example embodiment of the present invention. The communication control method includes steps S1 to S3 as illustrated in FIG. 2.

First, the communication control system 100 determines a first presence area in which a first terminal apparatus is located (S1), and determines, in accordance with the determined first presence area, a service area which provides a network service (S2). Lastly, the communication control system 100 controls connection between the network service and a second terminal apparatus in accordance with the determined service area (S3).

<Effect of Communication Control Method>

As described above, according to the communication control method according to the present example embodiment, a service area which provides a network service is determined in accordance with the determined first presence area in the step S2. Thus, the service area can be suitably changed even in a case where an area in which the first terminal apparatus is present has changed.

Furthermore, connection between the network service and a second terminal apparatus is controlled in accordance with the determined service area in the step S3. Thus, the connection between the second terminal apparatus and the network service is suitably controlled in accordance with the changed service area.

Second Example Embodiment

The following description will discuss a second example embodiment of the present invention in detail with reference to the drawings. Note that members having functions identical to those of the respective members described in the first example embodiment are given respective identical reference numerals, and a description of those members is omitted as appropriate.

<Configuration of Communication Control Apparatus 1>

Figure 3:
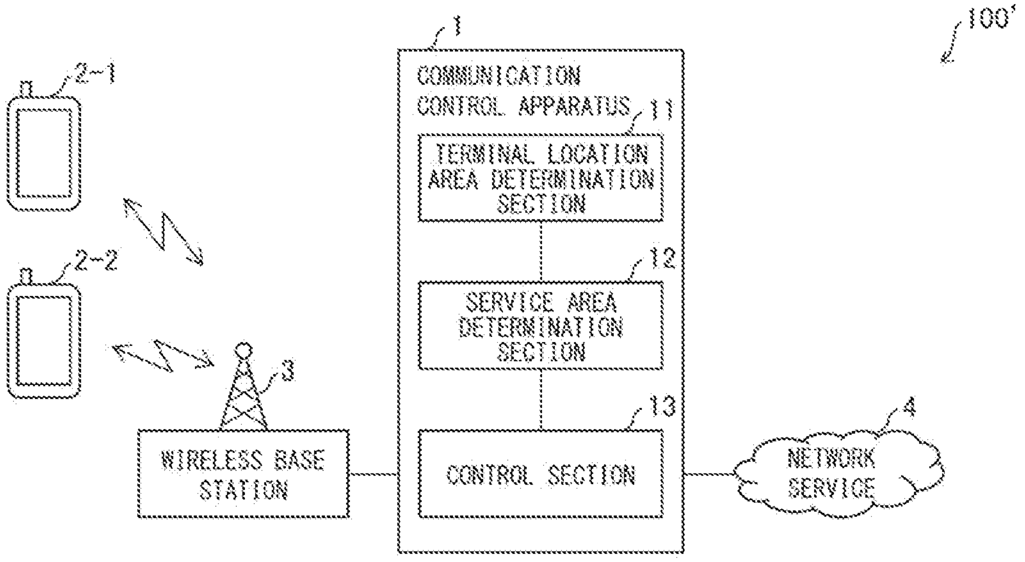
FIG. 3 is a block diagram illustrating a functional configuration of a communication control system including a communication control apparatus according to a second example embodiment of the present invention.

The following description will discuss, with reference to FIG. 3, a configuration of a communication control apparatus 1 according to the present example embodiment. FIG. 3 is a block diagram illustrating a functional configuration of a communication control system 100' including the communication control apparatus 1 according to a second example embodiment of the present invention. The communication control system 100' includes the communication control apparatus 1, a first terminal apparatus 2-1, and a second terminal apparatus 2-2.

The communication control apparatus 1 is connected to the first terminal apparatus 2-1 and the second terminal apparatus 2-2 via a wireless base station 3. Note that the wireless base station 3 corresponds to a next generation NodeB (gNB) in an architecture of a 5GC (described later).

The communication control apparatus 1 is also connected to a network service 4. The network service 4 is, for example, an LADN or the like in the 5GC.

A terminal location area determination section 11 determines a first presence area in which the first terminal apparatus 2-1 is located. The first presence area is, for example, TA information in a 5G core network or 4G core network defined by 3GPP.

A service area determination section 12 determines, in accordance with the determined first presence area, a service area which provides the network service 4. The network service 4 is, for example, a network service such as an LADN.

A control section 13 controls connection between the second terminal apparatus 2-2 and the network service 4 in accordance with the determined service area. For example, in a case where the second terminal apparatus 2-2 is located in the first presence area, the control section 13 connects the second terminal apparatus 2-2 and the network service 4. In a case where the second terminal apparatus 2-2 is not located in the first presence area, the control section 13 disconnects communication between the second terminal apparatus 2-2 and the network service 4.

Note that functions of sections of the communication control apparatus 1 may be implemented in a cloud. Furthermore, for example, the terminal location area determination section 11 and the service area determination section 12 may constitute a single apparatus, and the control section 13 may constitute a single apparatus. These sections may be mounted on a single apparatus, or may be mounted on separate apparatuses. For example, in a case where the sections are mounted on separate apparatuses, pieces of information pertaining to the respective sections are transmitted and received via a communication network to proceed with a process.

<Flow of Communication Control Method Carried Out by Communication Control Apparatus 1>

Figure 4:
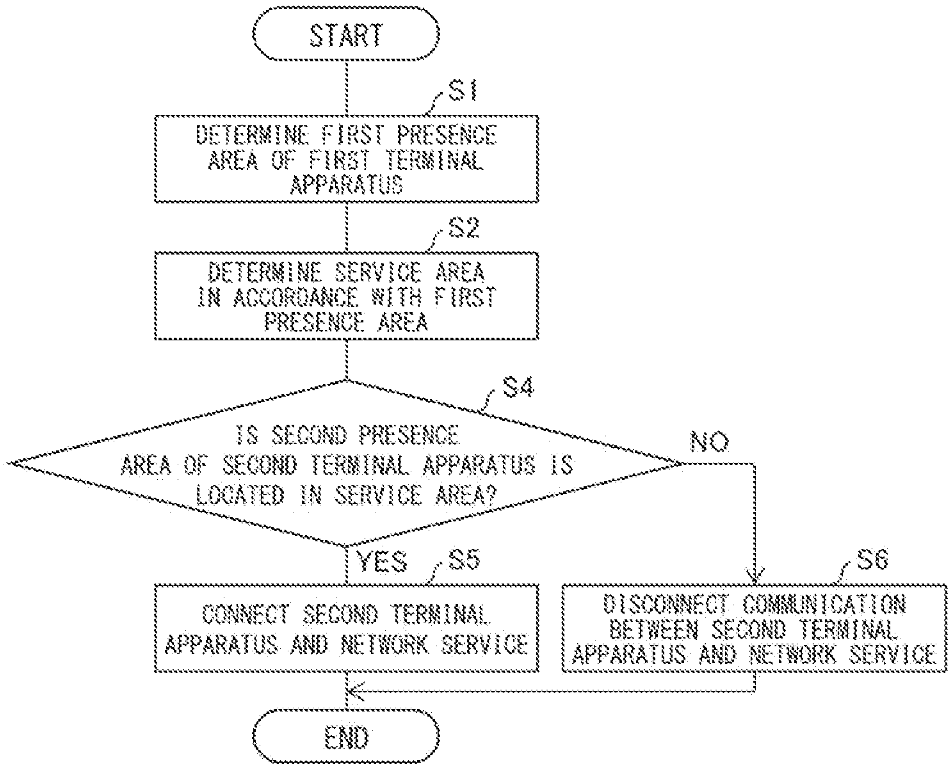
FIG. 4 is a flowchart showing a flow of a communication control method in the communication control apparatus according to the second example embodiment of the present invention.

The following description will discuss, with reference to FIG. 4, a flow of a communication control method carried out by the communication control apparatus 1 configured as described above. FIG. 4 is a flowchart showing the flow of the communication control method in the communication control apparatus 1 according to the second example embodiment of the present invention. The communication control method includes steps S1 to S6 as illustrated in FIG. 4.

First, the terminal location area determination section 11 determines a first presence area in which the first terminal apparatus 2-1 is located (S1). Then, the service area determination section 12 determines, in accordance with the determined first presence area, a service area which provides the network service 4 (S2).

Next, the terminal location area determination section 11 determines a second presence area in which the second terminal apparatus 2-2 is located. Then, the control section 13 determines whether the determined second presence area is located in the determined service area (S4).

In a case where the determined second presence area is located in the determined service area (Yes in S4), the control section 13 connects the second terminal apparatus 2-2 and the network service 4 (S5).

In a case where the determined second presence area is different from the determined service area (No in S4), the control section 13 disconnects communication between the second terminal apparatus 2-2 and the network service 4 (S6).

<Effect of Communication Control Apparatus 1>

As described above, according to the communication control apparatus 1 according to the present example embodiment, the service area determination section 12 determines, in accordance with the determined first presence area, a service area which provides the network service 4. Thus, the service area can be suitably changed even in a case where an area in which the first terminal apparatus 2-1 is present has changed.

The control section 13 controls connection between the second terminal apparatus 2-2 and the network service 4 in accordance with the determined service area. Thus, the connection between the second terminal apparatus 2-2 and the network service 4 is suitably controlled in accordance with the changed service area.

Third Example Embodiment

The following description will discuss a third example embodiment of the present invention in detail with reference to the drawings. Note that members having functions identical to those of the respective members described in the first and second example embodiments are given respective identical reference numerals, and a description of those members is omitted as appropriate.

<Configuration of Communication Control System 100A>

Figure 5:
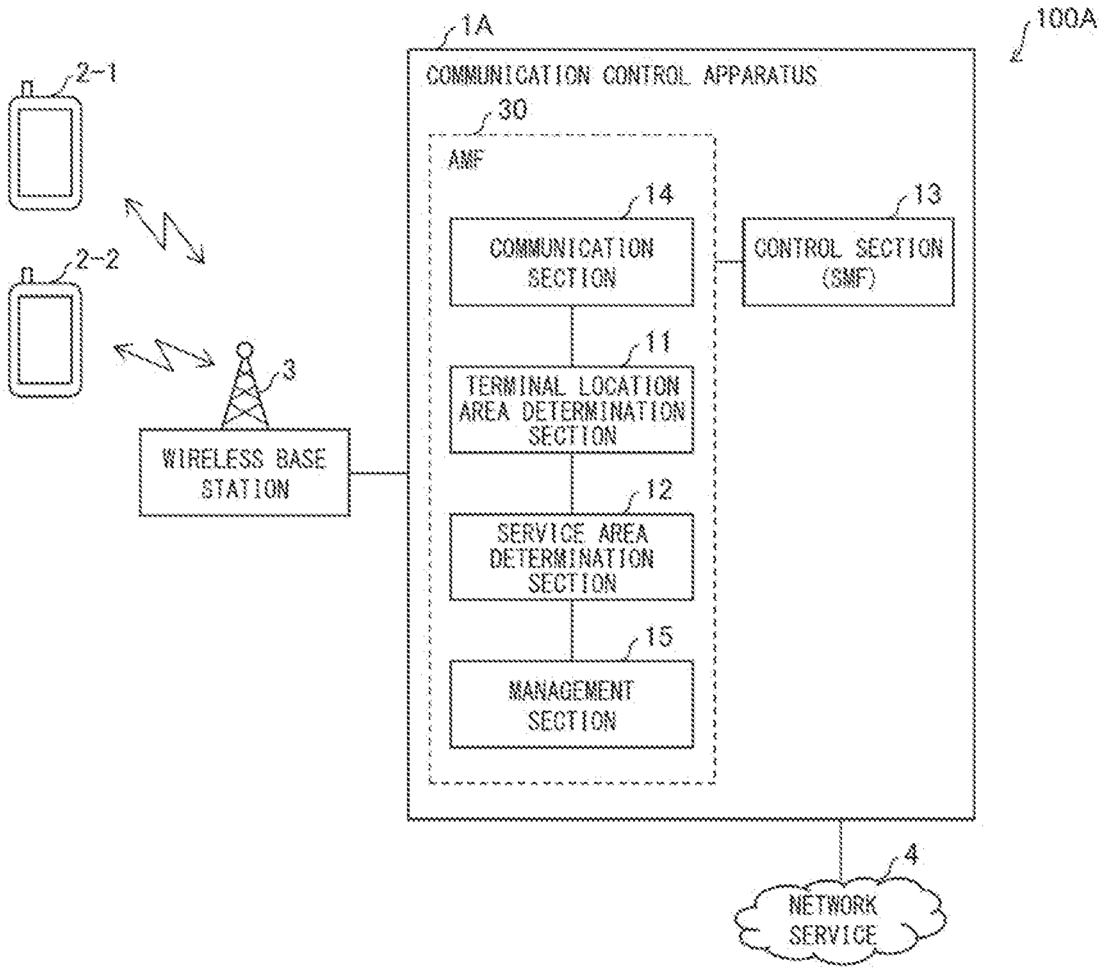
FIG. 5 is a block diagram illustrating a functional configuration of a communication control system including a communication control apparatus according to a third example embodiment of the present invention.

The following description will discuss, with reference to FIG. 5, a configuration of a communication control system 100A according to the present example embodiment. FIG. 5 is a block diagram illustrating a functional configuration of the communication control system 100A including a communication control apparatus 1A according to a third example embodiment of the present invention. The communication control system 100A includes the communication control apparatus 1A, a first terminal apparatus 2-1, and a second terminal apparatus 2-2 as illustrated in FIG. 5.

The communication control apparatus 1A is connected to the first terminal apparatus 2-1 and the second terminal apparatus 2-2 via a wireless base station 3. Note that the wireless base station 3 corresponds to, for example, a gNB in a 5GC (described later).

The communication control apparatus 1A is also connected to a network service 4. The network service 4 is, for example, a network service such as an LADN in the 5GC.

The communication control apparatus 1A includes a terminal location area determination section 11, a service area determination section 12, a control section 13, a communication section 14, and a management section 15. The management section 15 is configured to achieve a management means in the present example embodiment.

The terminal location area determination section 11, the service area determination section 12, the communication section 14, and the management section 15 correspond to an AMF in the 5GC (described later). The control section 13 corresponds to a session management function (SMF) in the 5GC (described later).

The communication section 14 communicates with the first terminal apparatus 2-1 and the second terminal apparatus 2-2 via the wireless base station 3. The communication section 14 also receives, from the wireless base station 3, a first presence area in which the first terminal apparatus 2-1 is located and a second presence area in which the second terminal apparatus 2-2 is located.

The terminal location area determination section 11 receives, via the communication section 14, the first presence area in which the first terminal apparatus 2-1 is located and the second presence area in which the second terminal apparatus 2-2 is located, and determines the first presence area and the second presence area.

The service area determination section 12 determines, in accordance with the first presence area determined by the terminal location area determination section 11, a service area which provides the network service 4. For example, the service area determination section 12 determines, as the service area, the first presence area in which the first terminal apparatus 2-1 is located. Note that determination of the service area by the service area determination section 12 refers to, for example, determination of an identifier of the service area by the service area determination section 12. Thus, the determination of the service area may also be expressed as "an area identifier is, for example, an identifier of a tracking area". For example, the service area is, for example, TA information in a 5GC and a 4GC.

The service area determination section 12 also changes the service area in accordance with movement of the first terminal apparatus 2-1 in a case where the first presence area has changed.

The management section 15 manages, in association with the first terminal apparatus 2-1 and the second terminal apparatus 2-2, network service information pertaining to the network service from which the first terminal apparatus and the second terminal apparatus are each receiving a service, present area information pertaining to an area in which the first terminal apparatus and the second terminal apparatus are each present, and information indicating whether the first terminal apparatus is a representative terminal apparatus.

Note here that the network service information is information for identifying the network service from which the first terminal apparatus 2-1 and the second terminal apparatus 2-2 are each receiving a service. For example, in a case where the first terminal apparatus 2-1 and the second terminal apparatus 2-2 can receive network services from a plurality of LADNs, the management section 15 manages the network service information as information that indicates from which LADN the first terminal apparatus 2-1 and the second terminal apparatus 2-2 are each receiving a service.

The present area information is information such as information pertaining to an area in which the first terminal apparatus 2-1 is present (a first presence area) and information pertaining to an area in which the second terminal apparatus 2-2 is present (a second presence area).

The representative terminal apparatus is a terminal apparatus that plays a special role of managing a service area which can be connected to a network service. For example, the first terminal apparatus 2-1 serves as such a representative terminal apparatus. The representative terminal apparatus will be described later in detail.

The service area determination section 12 determines, with reference to information that is managed by the management section 15 (hereinafter, referred to as management information), a service area which provides the network service 4. Note that a method for determining, with reference to the management information, the service area which provides the network service 4 will be described later with reference to a sequence diagram illustrated in FIG. 8.

Figures 6, 7:
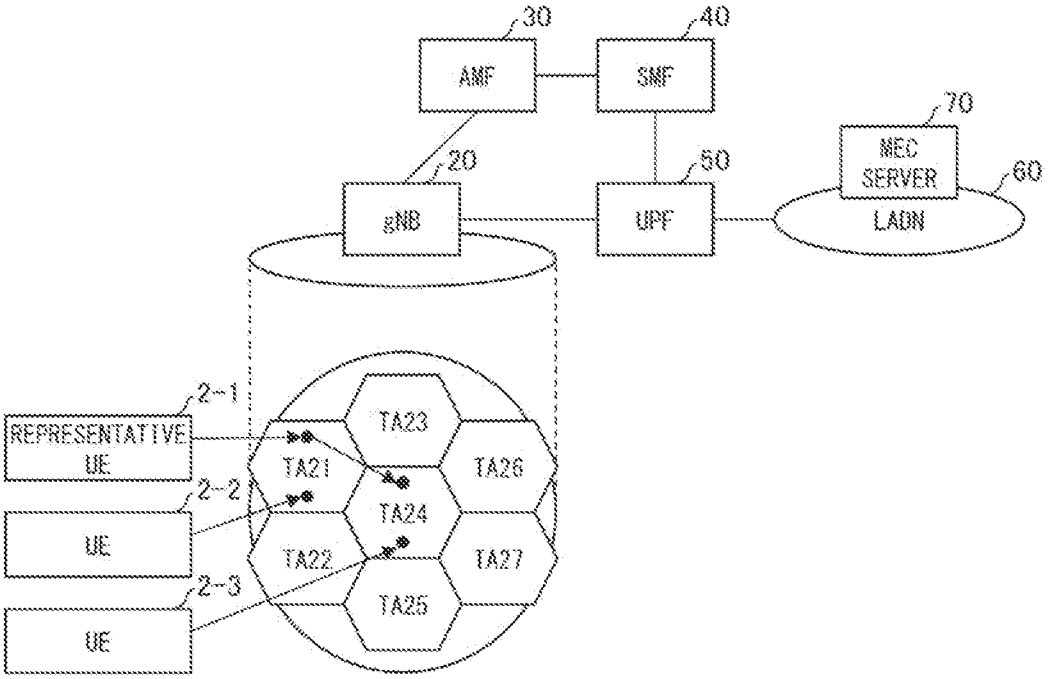
FIG. 6 is a diagram illustrating an example of a 5GC reference architecture according to the third example embodiment of the present invention.
FIG. 7 is a diagram illustrating an example of management information that is managed by a management section.

FIG. 6 is a diagram illustrating an example of a 5GC reference architecture according to the present example embodiment. A 5GC according to the present example embodiment includes a plurality of nodes as illustrated in FIG. 6. More specifically, the 5GC illustrated in FIG. 6 includes representative UE 2-1, a gNB 20, an AMF 30, an SMF 40, and a UPF 50 as the plurality of nodes. This plurality of nodes may be collectively referred to as a network function (NF).

The representative UE 2-1 corresponds to the first terminal apparatus 2-1 illustrated in FIG. 5. UE 2-2 corresponds to the second terminal apparatus 2-1 illustrated in FIG. 5. In FIG. 6, UE 2-3 is added as a third terminal apparatus.

The gNB 20 controls communication between (a) the representative UE 2-1, the UE 2-2, and the UE 2-3 and (b) the AMF 30 and the user plane function (UPF) 50. The gNB 20 also acquires the TA information pertaining to TAs in which the representative UE 2-1, the UE 2-2, and the UE 2-3 are present, and notifies the AMF 30 of the TA information. The gNB 20 is constituted by a plurality of tracking areas TA21 to TA27 as illustrated in FIG. 6.

The AMF 30 is an NF that provides, for example, authentication, permission, and mobility management of the representative UE 2-1, the UE 2-2, and the UE 2-3, and controls the SMF 40. The SMF 40 is an NF that is responsible for, for example, session management of the representative UE 2-1, the UE 2-2, and the UE 2-3, assignment of an IP address, and selection and control of the UPF 50 for data transfer. The AMF 30 illustrated in FIG. 6 has a function identical to the function of the AMF 30 illustrated in FIG. 5.

The terminal location area determination section 11 and the service area determination section 12 that are illustrated in FIG. 5 correspond to, for example, a mobility management function of the AMF 30. The communication section 14 illustrated in FIG. 5 corresponds to, for example, a communication function between the AMF 30 and the gNB 20, and an interface between the AMF 30 and the SMF 40. The management section 15 illustrated in FIG. 5 corresponds to, for example, an access authentication function and an access permission function of the AMF 30.

For example, in a case where the representative UE 2-1 establishes a plurality of sessions, the AMF 30 can assign different SMFs 40 to the respective sessions so that the SMFs 40 independently manage the sessions and use different functions for the respective sessions. In the 5GC, for example, management related to the representative UE 2-1 is carried out by a single AMF 30, and traffic is handled by an SMF 40 for each individual network slice.

In the 5GC, an architecture is employed in which processing is carried out while a control plane (C-Plane) for control signal communication such as communication establishment is separated from a user plane (U-Plane) for user data communication. The C-Plane includes, for example, the AMF 30 and the SMF 40. The U-Plane includes the UPF 50.

The UPF 50 is an NF that functions as an external protocol data unit (PDU) session point that interconnects with a data network (DN), and carries out, for example, packet routing and forwarding.

The LADN 60 is a data network to which only UE that is present in a specific service area can be connected, and is connected to the UPF 50. A mobile edge computing (MEC) server 70 is provided in the LADN 60.

The UPF 50 identifies an internet protocol (IP) address of a packet, and transmits, to the MEC server 60, only the packet that has a specific IP address. The UPF 50 also transmits, to an external network (DN) (not illustrated), a packet other than the packet that has a specific IP address. This enables the MEC server 70 to achieve lower delay communication as compared with communication with the external network (DN).

The representative UE 2-1 is a terminal apparatus that plays a special role of managing a service area which can be connected to the LADN 60. As illustrated in FIG. 6, in a case where the representative UE 2-1 is present in the tracking area TA21, TA21 is a service area of the LADN 60. The UE 2-2 is present in TA21. Thus, the UE 2-2 can enjoy a service of the LADN 60.

In a case where the representative UE 2-1 moves to the tracking area TA24, TA24 is the service area of the LADN 60. TA21 in which the representative UE 2-1 was previously present is deleted from the service area of the LADN 60. This prevents the UE 2-2 from enjoying the service of the LADN 60. In contrast, movement of the representative UE 2-1 enables the UE 2-3 that is present in TA24 to enjoy the service of the LADN 60.

FIG. 7 is a diagram illustrating an example of the management information that is managed by the management section 15. The management section 15 stores, as the management information, LADN information, presence information, a UE identifier, and representative information that have been received from the gNB 20. The LADN information is information that indicates which network service (LAND) UE is receiving, and corresponds to the network service information (described earlier).

The presence information is information that indicates a tracking area in which UE is present, and corresponds to the present area information (described earlier). The UE identifier is information for identifying UE. The representative information is information that indicates whether UE has representative authority, and corresponds to the information pertaining to the representative terminal apparatus (described earlier).

For example, it is indicated that the UE 2-1 (UE identifier=UE11) is the representative UE, is receiving the service of the LADN 60, and is present in the tracking area TA21. It is also indicated that UE 2-2 (UE identifier=UE12) is not the representative UE, is receiving the service of the LADN 60, and is present in the tracking area TA21. It is also indicated that the UE 2-3 (UE identifier=UE13) is not the representative UE, is receiving the service of the LADN 60, and is present in the tracking area TA24.

Figure 8:
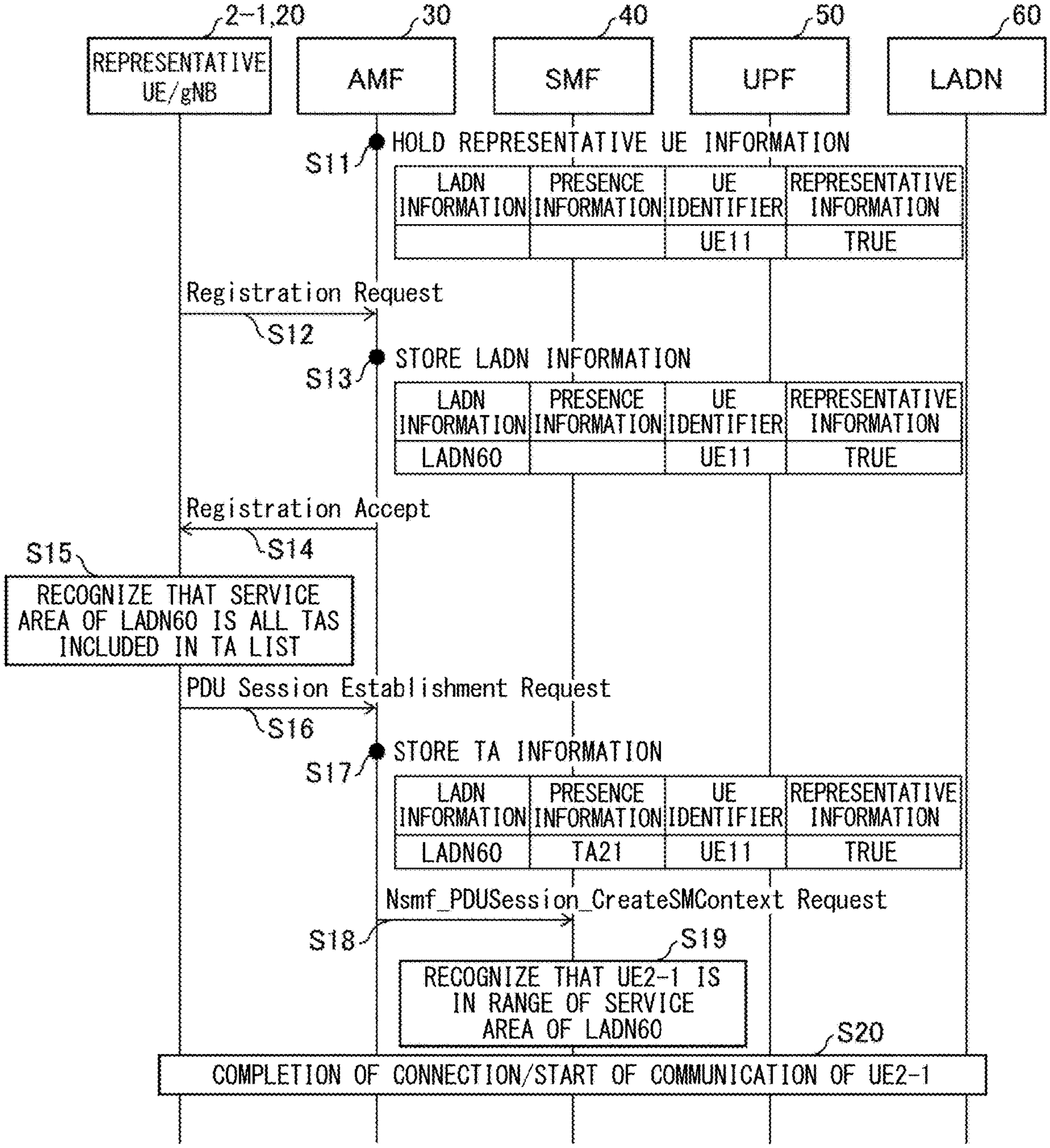
FIG. 8 is a diagram illustrating a sequence in a case where representative UE registers a service area of an LADN.

FIG. 8 is a diagram illustrating a sequence in a case where the representative UE 2-1 registers the service area of the LADN 60. First, the management section 15 of the AMF 30 holds the representative information which indicates that the UE 2-1 is the representative UE (S11). The management section 15 of the AMF 30 is assumed to have registered, in advance, the UE identifier and the representative information as registration information. As illustrated in FIG. 8, it is stored that the UE 2-1 (UE identifier=UE11) is the representative UE. Note that the description will be given assuming that the representative authority will not be taken over by another piece of UE.

Next, the representative UE 2-1 transmits, via the gNB 20, Registration Request that specifies the LADN 60 (S12).

In a case where the communication section 14 of the AMF 30 has received the Registration Request from the gNB 20, the management section 15 of the AMF 30 refers to the management information, recognizes that the UE 2-1 is the representative UE, and stores, as the management information, the LADN information included in the Registration Request (S13). As illustrated in FIG. 8, the LADN information (LADN 60) is stored in correspondence with the representative UE 2-1 (UE identifier=UE11).

Next, the communication section 14 of the AMF 30 specifies, as an area group in which the LADN 60 is capable of providing a service, all tracking areas included in the TA list, and transmits Registration Accept to the representative UE 2-1 (S14).

The TA list is a list of tracking areas which is to be assigned to UE by the management section 15 of the AMF 30 during Registration, and includes all the tracking areas in which the LADN 60 is capable of providing a service. The UE which recognizes that the UE has moved to an area other than the tracking areas included in the TA list transmits Registration Update Request to the AMF 30, and acquires a new TA list from the AMF 30. Every time the new TA list is assigned to the representative UE 2-1, the communication section 14 of the AMF 30 notifies the representative UE 2-1 of all the tracking areas included in the TA list as an area in which the LADN 60 is capable of providing a service.

The representative UE 2-1 that has received the Registration Accept from the AMF 30 refers to the TA list included in Registration Accept, and recognizes that the area in which the LADN 60 is capable of providing a service is all the tracking areas included in the TA list (S15).

3GPP Specification states that the UE cannot transmit PDU Session Establishment Request outside a range of the service area of the LADN 60. In the present example embodiment, the representative UE 2-1 recognizes that the area in which the LADN 60 is capable of providing a service is all the tracking areas included in the TA list. It is therefore possible to transmit the PDU Session Establishment Request to the LADN 60 only in a range of the tracking areas included in the TA list.

In a case where the representative UE 2-1 has moved to an area other than the tracking areas included in the TA list, by transmitting the Registration Update Request and acquiring a new TA list from the management section 15 of the AMF 30, the representative UE 11 can acquire a new area in which the LADN 60 is capable of providing a service.

Next, the representative UE 2-1 specifies the LADN 60 and transmits the PDU Session Establishment Request to the AMF 30 (S16). In a case where the communication section 14 of the AMF 30 has received the PDU Session Establishment Request from the representative UE 2-1, the management section 15 of the AMF 30 stores, as the management information, presence information (TA21) of the representative UE 2-1, the presence information being included in the PDU Session Establishment Request (S17). The presence information (TA21) of the representative UE 2-1 is determined as the service area of the LADN 60.

The service area determination section 12 of the AMF 30 determines that the representative UE 2-1 is present in a range in which the LAND 60 is capable of providing a service, and the communication section 14 of the AMF 30 transmits, to the SMF 40, Nsmf_PDUSession_CreateSMContext Request including a parameter (presenceInLadn=IN_AREA) indicating that the representative UE 2-1 is in a range of an area in which the LADN 60 provides a service (S18).

The SMF 40 refers to the parameter (presenceInLadn=IN_AREA) included in the Nsmf_PDUSession_CreateSMContext Request received from the AMF 30, recognizes that the representative UE 2-1 is present in the area in which the LADN 60 is capable of providing a service, and establishes a session (S19). Thereafter, a session between the representative UE 2-1 and the LADN 60 is established, so that the representative UE 2-1 and the LADN 60 can communicate with each other (S20).

The service area determination section 12 of the AMF 30 determines, in accordance with the determined first presence area and an area group in which a network service is capable of providing a service, a service area which provides the network service. Specifically, the service area determination section 12 of the AMF 30 sets all the tracking areas included in the TA list as the area group in which the network service (LADN 60) is capable of providing a service, and determines the service area of the LADN 60 in accordance with this area group and the first presence area.

Figure 9:
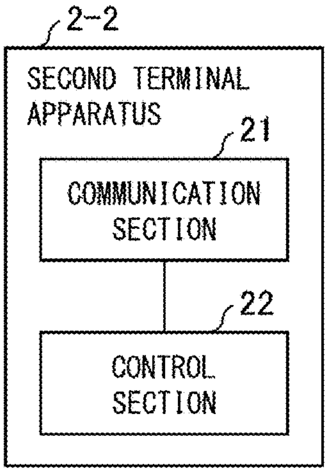
FIG. 9 is a block diagram illustrating a functional configuration of a terminal apparatus.

FIG. 9 is a block diagram illustrating a functional configuration of the second terminal apparatus 2-2. The second terminal apparatus 2-2 includes a communication section 21 and a control section 22 as illustrated in FIG. 9. The communication section a 21 is configured to achieve communication means in the present example embodiment. The control section 22 is configured to achieve a control means in the present example embodiment.

The communication section 21 transmits a request for registration in the LADN 60, and receives a response to the request for registration.

In a case where the service area of the LADN 60, the service area being included in the response received by the communication section 21, includes information pertaining to an area in which the second terminal apparatus 2-2 is present, the control section 22 causes the communication section 21 to transmit a request for establishment of a session with the LADN 60.

Figure 10:
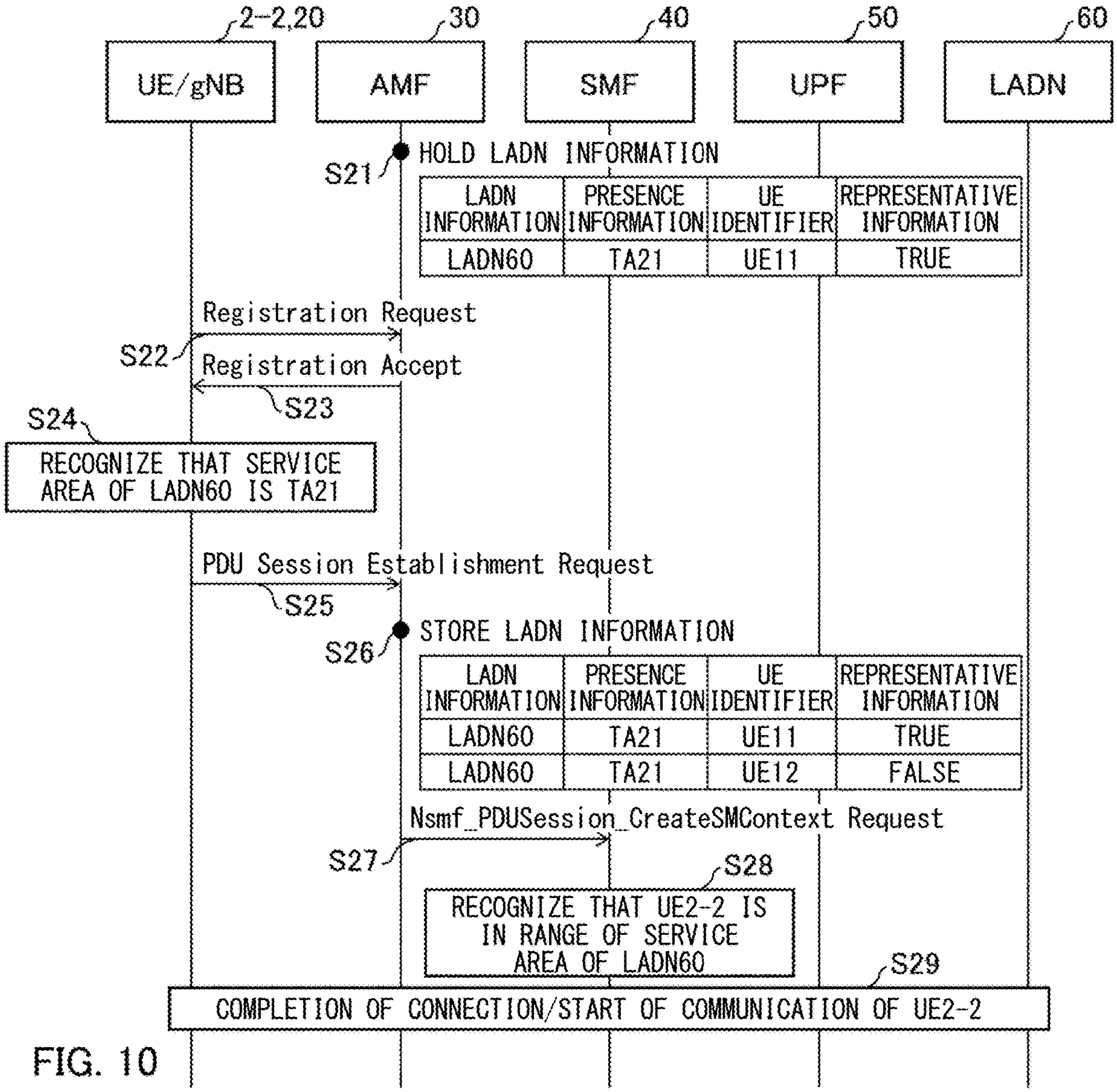
FIG. 10 is a diagram illustrating a sequence in a case where non-representative UE is connected to the LADN.

FIG. 10 is a diagram illustrating a sequence in a case where the non-representative UE 2-2 is connected to the LADN 60. As described with reference to the sequence diagram illustrated in FIG. 8, establishment of the session between the representative UE 2-1 and the LADN 60 allows the management section 15 of the AMF 30 to hold information pertaining to the service area of the LADN 60 (the tracking area TA21 in which the representative UE 2-1 is present) (S21).

Next, the communication section 21 of the UE 2-2 transmits, via the gNB 20, Registration Request that specifies the LADN 60 (S22). In a case where the communication section 14 of the AMF 30 has received the Registration Request from the gNB 20, the management section 15 of the AMF 30 refers to the management information, recognizes that the UE 2-2 is non-representative UE, specifies, as a service area corresponding to the LADN 60, the presence information (TA21) of the representative UE 2-1, the presence information being held by the management section 15 of the AMF 30, and transmits Registration Accept to the UE 2-2 (S23).

The communication section 21 of the UE 2-2 receives the Registration Accept and recognizes that the service area corresponding to the LADN 60 is TA21 (S24). Then, the control section 22 of the UE 2-2 recognizes that the UE 2-2 is present in TA21, which is the service area of the LADN 60, specifies the LADN 60, and transmits PDU Session Establishment Request to the AMF 30 (S25).

In a case where the communication section 14 of the AMF 30 has received the PDU Session Establishment Request from the UE 2-2, the management section 15 of the AMF 30 stores, as the management information, presence information (TA21) of the UE 2-2, the presence information being included in the PDU Session Establishment Request (S26).

The management section 15 of the AMF 30 determines that the UE 2-2 is present in a range in which the LAND 60 is capable of providing a service, and the communication section 14 of the AMF 30 transmits, to the SMF 40, Nsmf_PDUSession_CreateSMContext Request including a parameter (presenceInLadn=IN_AREA) indicating that the UE 2-2 is in the range of the area in which the LADN 60 provides a service (S27).

The SMF 40 refers to the parameter (presenceInLadn=IN_AREA) included in the Nsmf_PDUSession_CreateSMContext Request received from the AMF 30, recognizes that the UE 2-2 is present in the area in which the LADN 60 is capable of providing a service, and establishes a session (S28). Thereafter, a session between the UE 2-2 and the LADN 60 is established, so that the UE 2-2 and the LADN 60 can communicate with each other (S29).

Figure 11:
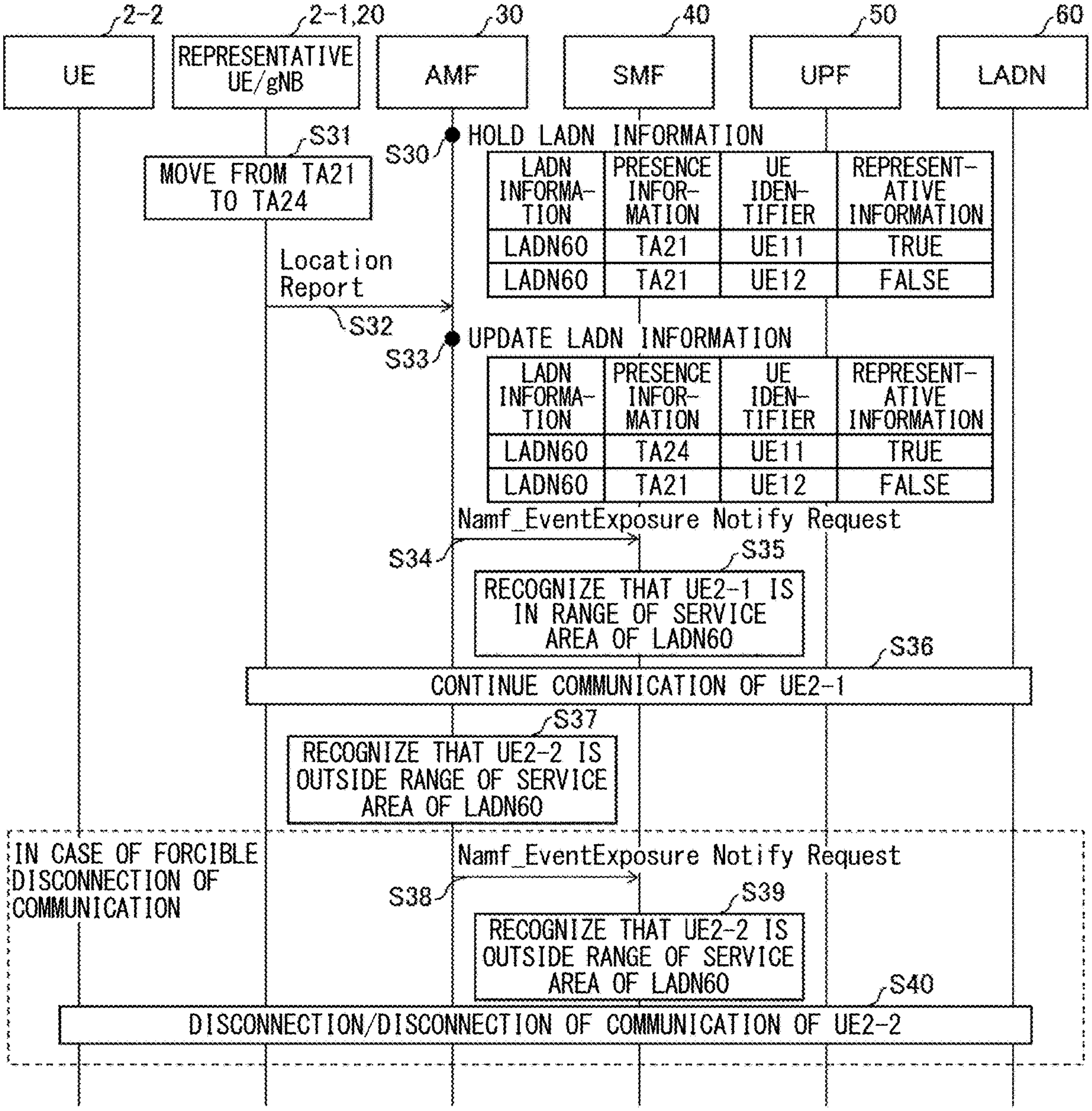
FIG. 11 is a diagram illustrating a sequence in a case where the representative UE moves between tracking areas and the service area of the LADN is changed.

FIG. 11 is a diagram illustrating a sequence in a case where the representative UE 2-1 moves between tracking areas and the service area of the LADN 60 is changed. As described with reference to the sequence diagram illustrated in FIG. 10, the management section 15 of the AMF 30 holds the management information of the representative UE 2-1 and the UE 2-2 (S30).

In a case where the representative UE 2-1 has moved from the tracking area TA21 to TA24 (S31), the gNB 20 detects that the representative UE 2-1 has moved and the tracking area has been changed from TA21 to TA24, and transmits, to the AMF 30, Location Report including the presence information (TA24) of the representative UE 2-1 (S32).

In a case where the communication section 14 of the AMF 30 has received the Location Report from the representative UE 2-1, the management section 15 of the AMF 30 refers to the presence information (TA24) of the representative UE 2-1, the presence information being included in the Location Report, and updates, from TA21 to TA24, the presence information of the representative UE 2-1 of the management information, the presence information being held by the management section 15 of the AMF 30 (S33). This changes the service area corresponding to the LADN 60 from TA21 to TA24. Also in a case where the tracking area has been changed due to movement of the non-representative UE, e.g., the UE 2-2, the management section 15 of the AMF 30 refers to the presence information included in the Location Report transmitted from the gNB 20, and updates the presence information of the UE 2-2, the presence information being held as the management information.

Next, in accordance with a change in tracking area of the representative UE 2-1, the management section 15 of the AMF 30 transmits, to the SMF 40, Namf_EventExposure Notify Request including a parameter (presenceInLadn=IN_AREA) indicating that the representative UE 2-1 is in an area in which the LADN 60 is capable of providing a service (S34).

The SMF 40 refers to the parameter (presenceInLadn=IN_AREA) included in the Namf_EventExposure Notify Request received from the AMF 30, recognizes that the representative UE 2-1 is present in the area in which the LADN 60 is capable of providing a service, and continues a session. Thus, communication between the representative UE 2-1 and the LADN 60 is continued (S36).

In accordance with movement of the tracking area of the representative UE 2-1, the service area corresponding to the LADN 60 has been changed from TA21 to TA24. Thus, the management section 15 of the AMF 30 recognizes that UE 2-2 which is present in the tracking area TA21 is outside a range of the service area of the LADN 60 (S37).

In a case where the non-representative UE, e.g., the UE 2-2 is outside the service area of the LADN 60 due to movement of the representative UE 2-1, movement of the UE 2-2, or deletion of the area in which the LADN 60 is capable of providing a service, the AMF 30 continues communication of corresponding UE or disconnects communication of the corresponding UE in accordance with a predetermined operation.

The AMF 30 which continues communication of the corresponding UE does not carry out anything. Thus, communication between the corresponding UE and the LADN 60 is continued. In a case where communication of the corresponding UE is disconnected at a different opportunity and establishment of the session is carried out again, the AMF 30 considers the corresponding UE to be outside the range of the service area of the LADN 60, and does not establish the session.

The AMF 30 which forcibly disconnects communication of the UE 2-2 transmits, to the SMF 40, Namf_EventExposure Notify Request including a parameter (AmfEventArea=OUT) indicating that the UE 2-2 is outside the area in which the LADN 60 is capable of providing a service (S38).

The SMF 40 receives the Namf_EventExposure Notify Request from the AMF 30, refers to the parameter (AmfEventArea=OUT) included in the Namf_EventExposure Notify Request, recognizes that the UE 2-2 is present outside the range of the area in which the LADN 60 is capable of providing a service (S39), and disconnects a session between the UE 2-2 and the LADN 60 (S40).

Figure 12:
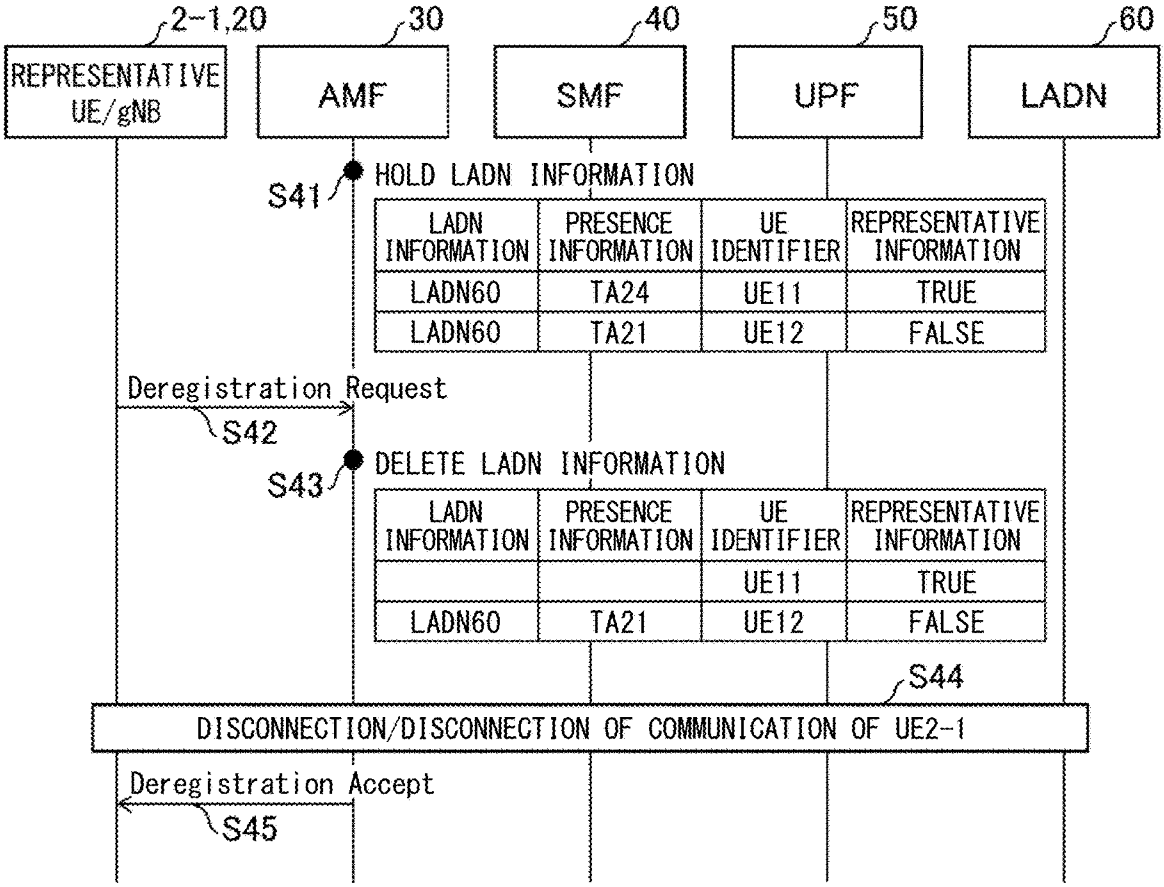
FIG. 12 is a diagram illustrating a sequence in a case where the service area of the LADN is deleted in accordance with disconnection of communication of the representative UE.

FIG. 12 is a diagram illustrating a sequence in a case where the service area of the LADN 60 is deleted in accordance with disconnection of communication of the representative UE 2-1. As described with reference to the sequence diagram illustrated in FIG. 11, the management section 15 of the AMF 30 holds the management information of the representative UE 2-1 and the UE 2-2 (S41).

The representative UE 2-1 that disconnects communication due to, for example, turning-off of power transmits Deregistration Request to the AMF 30 via the gNB 20 (S42).

In a case where the communication section 14 of the AMF 30 has received the Deregistration Request from the gNB 20, the management section 15 of the AMF 30 deletes the LADN information and the presence information of the representative UE 2-1 that are included in the management information (S43). Thus, the service area of the LADN 60 is deleted.

Thereafter, the AMF 30 disconnects communication between the representative UE 2-1 and the LADN 60 (S44), and transmits Deregistration Accept to the representative UE 2-1 (S45). Deletion of the service area of the LADN 60 forcibly disconnects communication of the non-representative UE, e.g., the UE 2-2, or continues communication, as in the case of the process illustrated in steps S38 to S40 in FIG. 10.

In the present example embodiment, the Deregistration Request transmitted from the representative UE 2-1 triggers deletion of the LADN information of the representative UE 2-1, the LADN information being included in the management information. Alternatively, the Deregistration Request transmitted from the AMF 30 may be configured to trigger deletion of the LADN information included in the management information. For example, deletion of the information pertaining to the representative UE 2-1 from the AMF 30 by an operation of a maintenance person may be configured to trigger deletion of the LADN information pertaining to the representative UE 2-1, the LADN information being included in the management information. Alternatively, deletion of the information pertaining to the representative UE 2-1 by an end of a watchdog timer set for the AMF 30 may be configured to trigger deletion of the LADN information pertaining to the representative UE 2-1, the LADN information being included in the management information.

As described above, according to the communication control apparatus 1A according to the present example embodiment, the service area determination section 12 changes a service area in accordance with movement of the first terminal apparatus 2-1 in a case where the first presence area has changed. Thus, the service area can be suitably changed even in a case where an area in which the first terminal apparatus 2-1 is present has changed.

Furthermore, the management section 15 manages, in association with the first terminal apparatus 2-1 and the second terminal apparatus 2-2, network service information pertaining to the network service from which the first terminal apparatus and the second terminal apparatus are each receiving a service, present area information pertaining to an area in which the first terminal apparatus and the second terminal apparatus are each present, and information indicating whether the first terminal apparatus is a representative terminal apparatus. This enables the service area determination section 12 to easily determine the service area which provides the network service.

[Software Implementation Example]

Some or all of functions of the communication control apparatuses 1 and 1A can be realized by hardware such as an integrated circuit (IC chip) or can be alternatively realized by software.

Figure 13:
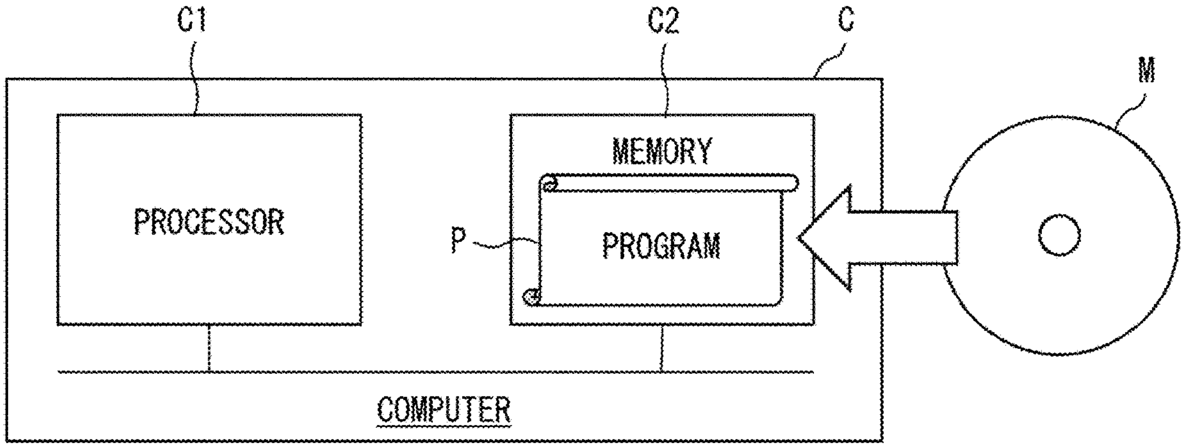
FIG. 13 is a diagram illustrating an example of hardware of a computer.

In the latter case, each of the communication control apparatuses 1 and 1A is realized by, for example, a computer that executes instructions of a program that is software realizing the functions. FIG. 13 illustrates an example of such a computer (hereinafter, referred to as "computer C"). The computer C includes at least one processor C1 and at least one memory C2. The memory C2 stores a program P for causing the computer C to operate as each of the communication control apparatuses 1 and 1A. In the computer C, the functions of the communication control apparatuses 1 and 1A are realized by the processor C1 reading the program P from the memory C2 and executing the program P.

The processor C1 may be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 may be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface for transmitting and receiving data to and from another apparatus. The computer C may further include an input/output interface for connecting the computer C to an input/output apparatus(es) such as a keyboard, a mouse, a display, and/or a printer.

The program P can also be recorded in a non-transitory tangible storage medium M from which the computer C can read the program P. Such a storage medium M may be, for example, a tape, a disk, a card, a semiconductor memory, a programmable logic circuit, or the like. The computer C can acquire the program P via the storage medium M. The program P can also be transmitted via a transmission medium. Such a transmission medium may be, for example, a communication network, a broadcast wave, or the like. The computer C can acquire the program P also via the transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can also be described as below. Note, however, that the present invention is not limited to the following supplementary notes.

(Supplementary Note 1)

A communication control system including:

a terminal location area determination means that determines a first presence area in which a first terminal apparatus is located;

a service area determination means that determines, in accordance with the determined first presence area, a service area which provides a network service; and a control means that controls, in accordance with the determined service area, connection between the network service and a second terminal apparatus which uses the network service.

According to the above configuration, the service area can be suitably changed even in a case where an area in which the first terminal apparatus is present has changed. Furthermore, the connection between the second terminal apparatus and the network service is suitably controlled in accordance with the changed service area.

(Supplementary Note 2)

The communication control system according to Supplementary note 1, wherein the service area determination means changes the service area in accordance with movement of the first terminal apparatus in a case where the first presence area has changed.

According to the above configuration, the service area can be suitably changed even in a case where an area in which the first terminal apparatus is present has changed.

(Supplementary Note 3)

The communication control system according to Supplementary note 1 or 2, wherein the terminal location area determination means determines a second presence area in which the second terminal apparatus is located, and the control means s connects the second terminal apparatus and the network service in a case where the determined second presence area is located in the determined service area.

According to the above configuration, the connection between the second terminal apparatus and the network service is suitably controlled.

(Supplementary Note 4)

The communication control system according to any one of Supplementary notes 1 to 3, wherein the terminal location area determination means determines a second presence area in which the second terminal apparatus is located, and the control means disconnects communication between the second terminal apparatus and the network service in a case where the determined second presence area is different from the determined service area.

According to the above configuration, the connection between the second terminal apparatus and the network service is suitably controlled.

(Supplementary Note 5)

The communication control system according to any one of Supplementary notes 1 to 4, further including a management means that manages, in association with the first terminal apparatus and the second terminal apparatus, information pertaining to the network service from which the first terminal apparatus and the second terminal apparatus are each receiving a service, information pertaining to an area in which the first terminal apparatus and the second terminal apparatus are each present, and information indicating whether the first terminal apparatus is a representative terminal apparatus, wherein the service area determination means determines, with reference to the information managed by the management means, the service area which provides the network service.

According to the above configuration, the service area which provides the network service can be easily determined.

(Supplementary Note 6)

The communication control system according to any one of Supplementary notes 1 to 5, wherein the service area determination means determines, in accordance with the determined first presence area and an area group in which the network service is capable of providing a service, the service area which provides the network service.

According to the above configuration, the service area which provides the network service can be suitably determined.

(Supplementary Note 7)

A communication control apparatus including:

a terminal location area determination means that determines a first presence area in which a first terminal apparatus is located;

a service area determination means that determines, in accordance with the determined first presence area, a service area which provides a network service; and a control means that controls, in accordance with the determined service area, connection between the network service and a second terminal apparatus which uses the network service.

According to the above configuration, the service area can be suitably changed even in a case where an area in which the first terminal apparatus is present has changed. Furthermore, the connection between the second terminal apparatus and the network service is suitably controlled in accordance with the changed service area.

(Supplementary Note 8)

The communication control apparatus according to Supplementary note 7, wherein the service area determination means changes the service area in accordance with movement of the first terminal apparatus in a case where the first presence area has changed.

According to the above configuration, the service area can be suitably changed even in a case where an area in which the first terminal apparatus is present has changed.

(Supplementary Note 9)

The communication control apparatus according to Supplementary note 7 or 8, wherein the terminal location area determination means determines a second presence area in which the second terminal apparatus is located, and the control means connects the second terminal apparatus and the network service in a case where the determined second presence area is located in the determined service area.

According to the above configuration, the connection between the second terminal apparatus and the network service is suitably controlled.

(Supplementary Note 10)

The communication control apparatus according to any one of Supplementary notes 7 to 9, wherein the terminal location area determination means determines a second presence area in which the second terminal apparatus is located, and the control means disconnects communication between the second terminal apparatus and the network service in a case where the determined second presence area is different from the determined service area.

According to the above configuration, the connection between the second terminal apparatus and the network service is suitably controlled.

(Supplementary Note 11)

The communication control apparatus according to any one of Supplementary notes 7 to 10, further including a management means that manages, in association with the first terminal apparatus and the second terminal apparatus, information pertaining to the network service from which the first terminal apparatus and the second terminal apparatus are each receiving a service, information pertaining to an area in which the first terminal apparatus and the second terminal apparatus are each present, and information indicating whether the first terminal apparatus is a representative terminal apparatus, wherein the service area determination means determines, with reference to the information managed by the management means, the service area which provides the network service.

According to the above configuration, the service area which provides the network service can be easily determined.

(Supplementary Note 12)

The communication control apparatus according to any one of Supplementary notes 7 to 11, wherein the service area determination means determines, in accordance with the determined first presence area and an area group in which the network service is capable of providing a service, the service area which provides the network service.

According to the above configuration, the service area which provides the network service can be suitably determined.

(Supplementary Note 13)

A communication control method including:

determining a first presence area in which a first terminal apparatus is located;

determining, in accordance with the determined first presence area, a service area which provides a network service; and controlling, in accordance with the determined service area, connection between the network service and a second terminal apparatus which uses the network service.

According to the above configuration, the service area can be suitably changed even in a case where an area in which the first terminal apparatus is present has changed. Furthermore, the connection between the second terminal apparatus and the network service is suitably controlled in accordance with the changed service area.

(Supplementary Note 14)

The communication control method according to Supplementary note 13, wherein in a process for determining the service area, the service area is changed in accordance with movement of the first terminal apparatus in a case where the first presence area has changed.

According to the above configuration, the service area can be suitably changed even in a case where an area in which the first terminal apparatus is present has changed.

(Supplementary Note 15)

The communication control method according to Supplementary note 13 or 14, wherein in a process for determining the first presence area, a second presence area in which the second terminal apparatus is located is determined, and in a process for controlling the connection between the second terminal apparatus and the network service, the second terminal apparatus and the network service are connected in a case where the determined second presence area is located in the determined service area.

According to the above configuration, the connection between the second terminal apparatus and the network service is suitably controlled.

(Supplementary Note 16)

The communication control method according to any one of Supplementary notes 13 to 15, wherein in a process for determining the first presence area, a second presence area in which the second terminal apparatus is located is determined, and in a process for controlling the connection between the second terminal apparatus and the network service, communication between the second terminal apparatus and the network service is disconnected in a case where the determined second presence area is different from the determined service area.

According to the above configuration, the connection between the second terminal apparatus and the network service is suitably controlled.

(Supplementary Note 17)

The communication control method according to any one of Supplementary notes 13 to 16, wherein information pertaining to the network service from which the first terminal apparatus and the second terminal apparatus are each receiving a service, information pertaining to an area in which the first terminal apparatus and the second terminal apparatus are each present, and information indicating whether the first terminal apparatus is a representative terminal apparatus are managed in association with the first terminal apparatus and the second terminal apparatus, and in a process for determining the service area, the service area which provides the network service is determined with reference to the managed information.

According to the above configuration, the service area which provides the network service can be easily determined.

(Supplementary Note 18)

The communication control method according to any one of Supplementary notes 13 to 17, wherein in a process for determining the service area, the service area which provides the network service is determined in accordance with the determined first presence area and an area group in which the network service is capable of providing a service.

According to the above configuration, the service area which provides the network service can be suitably determined.

(Supplementary Note 19)

The communication control system according to claim 1, wherein the control means registers each of the first terminal apparatus and the second terminal apparatus as a terminal apparatus that uses the network service.

(Supplementary Note 20)

The communication control apparatus according to claim 7, wherein the control means registers each of the first terminal apparatus and the second terminal apparatus as a terminal apparatus that uses the network service.

(Supplementary Note 21)

The communication control method according to claim 13, wherein in a process for controlling the connection between the second terminal apparatus and the network service, each of the first terminal apparatus and the second terminal apparatus is registered as a terminal apparatus that uses the network service.

(Supplementary Note 22)

The communication control method according to any one of Supplementary notes 15 to 20, wherein the service area is an identifier of an area.

(Supplementary Note 23)

A communication control system including at least one processor, the at least one processor carrying out:

a process for determining a first presence area in which a first terminal apparatus is located;

a process for determining, in accordance with the determined first presence area, a service area which provides a network service; and a process for controlling connection between the network service and a second terminal apparatus in accordance with the determined service area.

Note that the communication control system may further include a memory, in which a program for causing the at least one processor to carry out the process for determining the first presence area, the process for determining the service area, and the process for controlling the connection may be stored. Alternatively, the program may be stored in a non-transitory tangible computer-readable storage medium.

(Supplementary Note 24)

A terminal apparatus including:

a communication means that transmits a request for registration in a local area data network and that receives a response to the request for registration; and a control means that, in a case where a service area of the local area data network, the service area being included in the response received by the communication means, includes information pertaining to an area in which the terminal apparatus is present, causes the communication means to transmit a request for establishment of a session between the local area data network and the terminal apparatus.

REFERENCE SIGNS LIST

1, 1A Communication control apparatus
2-1 First terminal apparatus (representative UE)
2-2 Second terminal apparatus (UE)
3 Wireless base station
4 Network service
11 Terminal location area determination section
12 Service area determination section
13 Control section
14 Communication section
15 Management section
20 gNB
30 AMF
40 SMF
50 UPF
60 LADN
70 MEC server
100, 100', 100A Communication control system

What is claimed is:

1. A communication control system comprising at least one processor, the at least one processor configured to perform operations of:

managing information indicating whether a terminal apparatus is a representative terminal apparatus;

determining a first presence area in which a first terminal apparatus is located in a case where the first terminal apparatus is the representative terminal apparatus based on the managed information;

determining, in accordance with the determined first presence area, a service area in which a network service is provided; and controlling, in accordance with the determined service area, connection between the network service and a second terminal apparatus which uses the network service.

2. The communication control system according to claim 1, wherein in the operation of determining the service area, the at least one processor further configured to change the service area in accordance with movement of the first terminal apparatus in a case where the first presence area has changed.

3. The communication control system according to claim 1, wherein in the operation of determining the first presence area, the at least one processor further configured to determine a second presence area in which the second terminal apparatus is located, and in the operation of controlling the connection, the at least one processor further configured to connect the second terminal apparatus and the network service in a case where the determined second presence area is located in the determined service area.

4. The communication control system according to claim 1, wherein in the operation of determining the first presence area, the at least one processor further configured to determine a second presence area in which the second terminal apparatus is located, and in the operation of controlling the connection, the at least one processor further configured to disconnect communication between the second terminal apparatus and the network service in a case where the determined second presence area is different from the determined service area.

5. The communication control system according to claim 1, wherein the at least one processor is further configured to perform operations of:

managing, in association with the first terminal apparatus and the second terminal apparatus, management information including information pertaining to the network service from which the first terminal apparatus and the second terminal apparatus are each receiving a service, information pertaining to an area in which the first terminal apparatus and the second terminal apparatus are each present, and information indicating whether the first terminal apparatus is a representative terminal apparatus, and in the operation of determining the service area, the at least one processor further configured to determine, with reference to the management information, the service area in which the network service is provided.

6. The communication control system according to claim 1, wherein in the determining the service area, the at least one processor further configured to determine, in accordance with the determined first presence area and an area group in which the network service is providing a service, the service area in which the network service is provided.

7. A non-transitory computer-readable storage medium comprising instructions stored thereon that, when executed by at least one processor, cause the at least one processor to perform operations of:

managing information indicating whether a terminal apparatus is a representative terminal apparatus;

determining a first presence area in which a first terminal apparatus is located in a case where the first terminal apparatus is the representative terminal apparatus based on the managed information;

determining, in accordance with the determined first presence area, a service area in which a network service is provided; and controlling, in accordance with the determined service area, connection between the network service and a second terminal apparatus which uses the network service.

8. The non-transitory computer-readable storage medium according to claim 7, wherein the operation of determining the service area comprises changing the service area in accordance with movement of the first terminal apparatus in a case where the first presence area has changed.

9. The non-transitory computer-readable storage medium according to claim 7, wherein the operation of determining the first presence area comprises determining a second presence area in which the second terminal apparatus is located, and the operation of controlling the connection comprises connecting the second terminal apparatus and the network service in a case where the determined second presence area is located in the determined service area.

10. The non-transitory computer-readable storage medium according to claim 7, wherein the operation of determining the first presence area comprises determining a second presence area in which the second terminal apparatus is located, and the operation of controlling the connection comprises disconnecting communication between the second terminal apparatus and the network service in a case where the determined second presence area is different from the determined service area.

11. The non-transitory computer-readable storage medium according to claim 7, wherein the operations further comprise:

managing, in association with the first terminal apparatus and the second terminal apparatus, management information including information pertaining to the network service from which the first terminal apparatus and the second terminal apparatus are each receiving a service, information pertaining to an area in which the first terminal apparatus and the second terminal apparatus are each present, and information indicating whether the first terminal apparatus is a representative terminal apparatus, and wherein the operation of determining the service area comprises determining, with reference to the management information, the service area in which the network service is provided.

12. The non-transitory computer-readable storage medium according to claim 7, wherein the operation of determining the service area comprises determining, in accordance with the determined first presence area and an area group in which the network service is providing a service, the service area in which the network service is provided.

13. A communication control method comprising:

managing information indicating whether a terminal apparatus is a representative terminal apparatus;

determining a first presence area in which a first terminal apparatus is located in a case where the first terminal apparatus is the representative terminal apparatus based on the managed information;

determining, in accordance with the determined first presence area, a service area in which a network service is provided; and controlling, in accordance with the determined service area, connection between the network service and a second terminal apparatus which uses the network service.

14. The communication control method according to claim 13, wherein in a process for determining the service area, the service area is changed in accordance with movement of the first terminal apparatus in a case where the first presence area has changed.

15. The communication control method according to claim 13, further comprising determining a second presence area in which the second terminal apparatus is located, and in a process for controlling the connection between the second terminal apparatus and the network service, wherein the second terminal apparatus and the network service are connected in a case where the determined second presence area is located in the determined service area.

16. The communication control method according to claim 13, further comprising:

determining a second presence area in which the second terminal apparatus is located, and in a process for controlling the connection between the second terminal apparatus and the network service, wherein communication between the second terminal apparatus and the network service is disconnected in a case where the determined second presence area is different from the determined service area.

17. The communication control method according to claim 13, further comprising:

managing, in association with the first terminal apparatus and the second terminal apparatus, management information including information pertaining to the network service from which the first terminal apparatus and the second terminal apparatus are each receiving a service, information pertaining to an area in which the first terminal apparatus and the second terminal apparatus are each present, and information indicating whether the first terminal apparatus is a representative terminal apparatus, and in a process for determining the service area, the service area in which the network service is provided is determined with reference to the management information.

18. The communication control method according to claim 13, wherein in a process for determining the service area, the service area in which the network service is provided is determined in accordance with the determined first presence area and an area group in which the network service is capable of providing a service.

* * * * *